United States Patent [19]

Maruyama et al.

[11] Patent Number: 4,588,601
[45] Date of Patent: May 13, 1986

[54] METHOD OF PRODUCING PASTE PRODUCT LIKE LOBSTER'S MEAT

[75] Inventors: Tsutomu Maruyama; Mitugi Ikoma; Kiyoe Satoh, all of Chiba, Japan

[73] Assignee: Kibun Company Limited, Tokyo, Japan

[21] Appl. No.: 757,901

[22] Filed: Jul. 22, 1985

Related U.S. Application Data

[63] Continuation of Ser. No. 552,470, Nov. 16, 1983, abandoned.

[51] Int. Cl.⁴ .................. A22C 25/00; A23L 1/325
[52] U.S. Cl. .................................. 426/574; 426/643; 426/656; 426/657; 426/513
[58] Field of Search ............... 426/574, 513, 643, 656, 426/657

[56] References Cited

U.S. PATENT DOCUMENTS 3,615,720 10/1971 Knutrud ..................... 426/513
3,863,017 1/1975 Yueh ......................... 426/643
3,987,209 10/1976 André et al. ................ 426/513 X
4,158,065 6/1979 Sugino ....................... 426/513 X
4,362,752 12/1982 Sugino et al. ................ 426/643 X
4,396,634 8/1983 Shenouda et al. ............. 426/643 X
4,439,456 3/1984 Kammuri et al. ............. 426/643 X

*Primary Examiner*—Robert Yoncoskie
*Attorney, Agent, or Firm*—Browdy and Neimark

[57] ABSTRACT

A method of producing a paste product like lobster's meat is disclosed which comprises dividing finely paste product, which product has been already coagulated by heating; mixing said divided product with protein mixture and molding the resulting mixture, the mixing and/or molding procedure being carried out under reduced pressure; and then heating the molded product. The thus obtained paste product like lobster's meat according to the present invention has moderately hard flesh, and during chewing, an elastic and pleasant mouth feel is obtained as if eating natural lobster's meat.

6 Claims, No Drawings

METHOD OF PRODUCING PASTE PRODUCT LIKE LOBSTER'S MEAT

This applicant is a continuation of Ser. No. 552,470, filed on Nov. 16, 1983, abandoned.

The present invention relates to a method of producing paste product like lobster's meat.

More particularly, it relates to a method of producing paste product like lobster's meat from heated fish paste and protein mixture.

In general, the lobster has an elastic meat texture and nice crisp mouth feel, and it tastes very good, therefore it is highly prized.

Meanwhile, paste products from minced meat, have been long known including a heated fish paste, Chikuwa (a kind of fish paste), Hanpen (a cake of pounded fish), etc., but, all of them have simple mouth feel and are uninadequately hard to masticate i.e. they do not have a firm texture like lobster meat.

More recently, products like crab's meat prepared by dividing finely the heated fish paste have been making their appearances on the market, and an attempt to improve said simple mouth feel of paste product has been started.

The present inventors have pursued their studies of obtaining a paste product like lobster's meat in order to give variety to mouth feel of paste product, and then they have succeeded in preparing a paste product having an improved mouth feel as if eating natural lobster's meat, by the method according to the present invention.

The present invention involves a method of producing a paste product like lobster's meat characterized in that the method comprises finely dividing a paste product, which has been already coagulated by heating; mixing it with a protein mixture and molding the resulting mixture into a certain shape, either the mixing or molding procedure or both procedures being carried out under reduced pressure; and then heating the shaped product.

The paste product like lobster's meat obtained by the present invention has moderately hard flesh, and when chewing it, an elastic mouth feel and a nice mouth feel are obtained as if eating natural lobster's meat.

Hitherto many paste products have been known, however, the paste product like lobster's meat obtained by the present invention differs from the paste product of prior art in mouth feel, therefore the paste product of the present invention has novel characteristics.

A main feature of this invention lies in that the finely divided paste product, having been already hardened by heating, is mixed with protein mixture and is molded the resulting mixture, the mixing and/or molding procedure being carried out under reduced pressure. A product prepared by mixing protein mixture with the finely divided paste product having been hardened by heating and then molding the resulting mixture at atmospheric pressure without any care contains considerable air, and thereby the product which is prepared by heating the air containing molded results in a product which does not have hard flesh and does not display the elastic and nice mouth feel peculiar to lobster's meat. On the contrary, according to the present invention, the finely divided fish paste product having been already coagulated by heating is mixed with protein mixture and/or is molded the resulting mixture under reduced pressure, so that the texture of thus obtained one becomes tight by the removal of fine air bubbles, i.e. the elimination of considerable porosity, and resulting in a paste product having good mouth feel as if eating natural lobster's meat.

As the fish paste product coagulated by heat used in the present invention, it is possible to use either heated fish paste produced by conventional techniques or such paste prepared by heating protein mixture used in the present invention to be coagulated. The method of producing said fish paste product is not restricted particularly. Next, the present invention will be described by taking a heated fish paste as an example.

First of all, the heated fish paste is finely divided by the method in which it is finely divided into the form of fine string or fine stick by cutting blade, or it is finely cut into small pieces or fine granules. It is also possible that it be previously broken into large flakes, and at the time of ulterior mixing with protein mixture, the large flakes are broke into small pieces.

And as the protein mixture used in the present invention, it is possible to use either minced fish meat (Surimi) or a mixture prepared by mixing minced fish meat with egg white, soybean protein, sodium caseinate or wheat protein in an amount which is about equal to, or slightly smaller than the amount of minced fish meat (1 to 100% egg white etc. relative to the minced fish meat). In this case, it is possible to mix starch, seasoning, oil, flavor etc. therewith according to requirements.

The finely divided heated fish paste is mixed with the protein mixture. In this case, the finely divided heated fish paste to protein mixture weight ratio may vary from about 5:5 to about 9:1, the preferred range being from about 6:4 to about 8:2 in order to obtain nice mouth feel. When the protein mixture is used in a large amount which is equal to or more than said weight ratio of 5:5, the resulting texture becomes similar to that of boiled fish paste; on the contrary, when the protein mixture is used in a small amount which is equal to or less than said weight ratio of 9:1, it has insufficient effect as a binder, so that the resulting product is devoid of nice elasticity which is desirable property.

The finely divided heated fish paste and protein mixture are mixed and/or molded under reduced pressure. Ordinarily, the mixing under reduced pressure is accomplished by agitating in an agitator that can be sealed hermetically and can provide inside an environment of reduced pressure. The degree of reduced pressure is preferably about 0 to 260 mm Hg; in the present invention, it is preferred to agitate rapidly at a reduced pressure near vacuum. It is a matter of course that the present invention may be successfully accomplished under weakly reduced pressure, at 260 mm of Hg pressure or less. In this case, the bond degree of the fibers is lowered, and therefore it is necessary to take care of the viscosity of protein mixture, the combination ratio of finely divided heated fish paste and protein mixture, the state of the bond of finely divided heated fish paste and protein mixture after heating, and so on.

As the agitator, a mixer, kneader, cutter and so on which permit adequate agitation can be all utilized. For example, it is preferred to use such an agitator that is provided with a moving vane inside thereof which rotates at the rate of about 40 r.p.m. It is undesirable to rotate the moving vane too fast, because it causes breakage of the fibrous texture of finely divided heated fish paste. The agitator is provided with cover in the upper part to be sealed hermetically and is connected with a decompression device via hose to keep the pressure of 0 to about 260 mm Hg inside the agitator.

The finely divided heated fish paste and the protein mixture are put in an agitator and agitated for about 5 to 20 minutes under reduced pressure. The thus obtained mixture may be directly molded into a shape of lobster's meat by using molds of various shapes or it may be molded by an automatic molding machine.

In addition, in the present invention, the heated fish paste (Kamaboko), being finely divided, is mixed with the protein mixture at atmospheric pressure followed by molding of the resulting mixture in the automatic molding machine wherein the reduced pressure is kept, so that it is also possible to carry out decompression of the mixture sufficiently.

In this case, it is also preferred to keep pressure of about 0 to about 260 mm Hg. In addition, in the present invention, both mixing and molding procedures can be carried out under reduced pressure.

The mixture is decompressed and molded, followed by heating for example steaming, boiling or broiling. In case of heating with steam, the heating procedure is accomplished by heating it with steam at a temperature of 90° C. for about 15 minutes. According to requirements, it is also possible that the mixture is subjected to setting before the heating procedure in order enhance coagulation.

The mixture which has been subjected to the heating with steam scarcely contains any ununited finely divided heated fish paste, and to the contrary it is united to the protein mixture, and to all appearances, it does not differ from conventional paste product in appearance. However, when eating it, lobsterlike taste, toughness, elastic texture and mouth feel are obtained.

Thus obtained lobsterlike paste product is frozen or chilled and then sold commercially. When eating, the frozen or chilled product is broiled and sauce may be placed thereon, and then eaten. A nice mouth feel is obtained as if eating natural lobster's meat.

Next, the present invention is described in the following Example.

EXAMPLE 1

The heated fish paste which had been seasoned like lobster was divided into a shape of about 3×20×30 cm, and was further divided into the form of fibers of 0.5×0.5×20 mm, on an average, by a cutter.

7 kg of the resulting heated fish paste in the form of fibers and 3 kg of saline pollack minced meat seasoned like lobster were put in to an agitator of closed type connected with a decompression pump, and then were agitated under reduced pressure, at a pressure of 5-10 mm Hg, at the rate of 40 r.p.m. for 5 minutes.

The thus obtained mixture was put in an automatic molding machine where it was molded into irregular lump like lobster, and it was allowed to stand in a steam chamber of 35° C. for 10 minutes to accomplish the setting.

Thus obtained product was subjected to a heating treatment with steam at a temperature of 90° C. for 10 minutes in a continuous cooker. And then the surface thereof was broiled to obtain a product like broiled lobster.

Thus obtained paste product had an excellent elastic mouth feel and tight textural properties resembling those of lobster's meat.

EXAMPLE 2

A heated fish paste which had been seasoned like lobster was divided into a shape of about 3×20×30 cm, and was further divided into the form of fiber of 0.5×0.5×20 mm, on an average, by cutter.

7 kg of thus obtained heated fish paste having the shape of fibers and a protein mixture (such one prepared by mixing 1.5 kg of pollack minced meat, 25 g of table salt, 1 kg of egg white, 300 g of soybean protein and 20 g of lobster oil flavor) were put in a closed type agitator connected with a decompression pump, and then were agitated under reduced pressure, at a pressure of 5 to 10 mm Hg, at the rate of 40 r.p.m. for 5 minutes.

Thus obtained mixture was put in an automatic molding machine where it was molded into irregular lump like lobster, and it was allowed to stand in a steam chamber of 35° C. for 10 minutes to accomplish the setting.

The thus obtained product was subjected to a heating treatment with steam at a temperature of 90° C. for 10 minutes in a continuous cooker. And then red color was applied on the surface thereof to obtain the paste product like lobster.

Thus obtained paste product had an excellent elastic mouth feel and tight textural properties resembling those of lobster's meat.

EXAMPLE 3

A heated fish paste which had been seasoned like lobster was divided into a shape of about 3×20×30 cm, and was further divided into the form of fiber of 0.5×0.5×20 mm, on an average, by cutter.

7 kg of thus obtained heated fish paste having the shape of fibers and 3 kg of saline pollack minced meat seasoned like lobster were put in an agitator and agitated at the rate of 40 r.p.m. for 5 minutes.

Thus obtained mixture was put in an automatic vacuum molding machine where it was molded into irregular lump like lobster under reduced pressure, at a pressure of 60 mm of Hg pressure, and then it was allowed to stand in a steam chamber of 35° C. for 10 minutes to accomplish the setting.

The thus obtained product was subjected to a heating treatment with steam at a temperature of 90° C. for 10 minutes in a continuous cooker to obtain a paste product like lobster.

Thus obtained paste product had an excellent elastic mouth feel and tight textural properties resembling those of lobster's meat.

EXAMPLE 4

A heated fish paste which had been seasoned like lobster was divided into a shape of about 3×20×30 cm, and was further divided into the form of fibers of 0.5×0.5×20 mm, on an average, by cutter.

7 kg of thus heated boiled fish paste having the shape of fibers and protein mixture (such one prepared by mixing 3 kg of saline pollack minced meat, 2 kg of egg white and 30 g of table salt) were put in a closed type agitator connected with a decompression pump, and then were agitated under reduced pressure, at a pressure of 5-10 mm Hg, at the rate of 40 r.p.m. for 5 minutes.

The thus obtained mixture was put in an automatic vacuum molding machine where it was molded into irregular lump like lobster under reduced pressure, at a degree of reduced pressure of 60 mm Hg, and then it was allowed to stand in a steam chamber of 35° C. for 10 minutes to accomplish the setting.

The thus obtained product was subjected to a heating treatment with steam at a temperature of 90° C. for 10 minutes in a continuous cooker. And then red color was applied on the surface thereof to obtain the paste product like lobster.

Thus obtained paste product had an excellent elastic mouth feel and tight textural properties resembling those of lobster's meat.

What is claimed is:

1. A method of producing simulated lobster meat, comprising the steps of:
   preparing a fish paste comprising a first protein mixture, said first protein mixture comprising minced fish meat;
   heat coagulating said fish paste;
   finely dividing said heat-coagulated fish paste;
   mixing said finely divided, heat-coagulated fish paste with a second protein mixture as a binder in a weight ratio of 5:5 to 9:1 under a reduced pressure in the range of 0 to 260 mm Hg for about 5 to 20 minutes, wherein said first and second protein mixtures are the same or different;
   molding the resulting mixture and heating the molded mixture sufficiently to set said molded mixture thereby obtaining said simulated lobster meat having a firm structure.

2. The method of claim 1, wherein said first protein mixture further comprises egg white, soybean protein, sodium caseinate or wheat protein in an amount of from 1 to 100% of the weight of said minced meat.

3. The method of claim 2, wherein said first protein mixture and said second protein mixture are the same.

4. A method of producing simulated lobster meat, comprising the steps of:
   heat-coagulating a fish paste;
   finely dividing said heat-coagulated fish paste;
   mixing said finely divided, heat-coagulated fish paste with a protein binder in a weight ratio of 5:5 to 9:1 under a reduced pressure in the range 0 to 260 mm Hg for about 5 to 20 minutes;
   molding the resulting mixture; and heating the molded mixture sufficiently to set said mixture thereby obtaining said simulated lobster meat having a firm structure.

5. A method according to claim 4 wherein the finely divided fish paste is cut boiled fish paste, broken boiled fish paste, or a mixture thereof.

6. A method according to claim 4 wherein protein binder is either minced fish meat or a mixture of minced fish meat and at least one member selected from the group consisting of egg white, soybean protein, sodium caseinate and wheat protein.

* * * * *